(12) United States Patent
Chan et al.

(10) Patent No.: US 9,850,030 B2
(45) Date of Patent: Dec. 26, 2017

(54) COLLAPSIBLE BOX WITH SIDE WALL ARTICLE SUPPORTS

(71) Applicants: Michael L. F. Chan, Berkeley, CA (US); David M. F. Chan, Lafayette, CA (US)

(72) Inventors: Michael L. F. Chan, Berkeley, CA (US); David M. F. Chan, Lafayette, CA (US)

(*) Notice: Subject to any disclaimer, the term of this patent is extended or adjusted under 35 U.S.C. 154(b) by 72 days.

(21) Appl. No.: 15/000,965

(22) Filed: Jan. 19, 2016

(65) Prior Publication Data

US 2016/0214765 A1 Jul. 28, 2016

Related U.S. Application Data

(60) Provisional application No. 62/106,930, filed on Jan. 23, 2015.

(51) Int. Cl.
| | |
|---|---|
| B65D 6/00 | (2006.01) |
| B65D 25/20 | (2006.01) |
| A01G 9/02 | (2006.01) |
| B65D 21/08 | (2006.01) |

(52) U.S. Cl.
CPC ......... B65D 25/205 (2013.01); A01G 9/026 (2013.01); *B65D 21/083* (2013.01); *B65D 21/086* (2013.01)

(58) Field of Classification Search
CPC .. B65D 25/205; B65D 21/083; B65D 21/086; B65D 11/1873; B65D 7/24; B65D 2519/00288; B65D 2519/00164; B65D 2519/00338; A01G 9/026

USPC .......... 220/666, 6, 7, 4.28, 4.29, 4.31, 4.32, 220/4.33, 4.34, 8; 206/546, 577, 600, 206/517

See application file for complete search history.

(56) References Cited

U.S. PATENT DOCUMENTS

| | | |
|---|---|---|
| 721,003 A | 2/1903 | Boutwell |
| 879,855 A | 2/1908 | Cronbaugh |
| 925,799 A | 6/1909 | Boyd |
| 1,022,814 A | 4/1912 | Beehler |
| 1,200,085 A | 10/1916 | Crane |
| 1,903,722 A | 4/1933 | Merritt |
| 2,260,423 A | 10/1941 | Washbourne |
| 2,686,645 A | 8/1954 | Whitehurst |
| 1,885,070 A | 5/1959 | Ondreja |
| 2,919,045 A | 12/1959 | Waugh |
| 3,799,382 A | 3/1974 | Munroe |
| 3,823,508 A | 7/1974 | Takehara |
| 3,955,681 A | 5/1976 | DeZinno |
| 4,077,593 A | 3/1978 | Carratala |
| 4,664,282 A * | 5/1987 | Chan ........................ A01G 9/02 217/36 |
| 8,833,573 B2 * | 9/2014 | Tomaszewski ...... B65D 19/385 108/186 |

(Continued)

*Primary Examiner* — Kareen Thomas
(74) *Attorney, Agent, or Firm* — Thomas Schneck

(57) ABSTRACT

A parallelogram shaped box with side walls formed by parallel, generally rectangular bar members has a plurality of grommets inserted into the side walls between the bar members. Each grommet is trapped between adjacent bar members by clamping of adjacent bar members. Each grommet has a thickness greater than the thickness of the bar members and has a boss in the grommet with a pin retainer in the grommet, such as a straight hole. A pin placed in the pin retainer can support a decorative article so that external sides of the box can be decorated.

2 Claims, 4 Drawing Sheets

(56) References Cited

U.S. PATENT DOCUMENTS

2005/0188902 A1\* 9/2005 Savoie .................... A47B 3/08
  108/107
2008/0041849 A1\* 2/2008 Wang ....................... B65D 9/06
  220/4.28
2013/0055604 A1\* 3/2013 Herman Baran ...... A47B 45/00
  40/606.03

\* cited by examiner

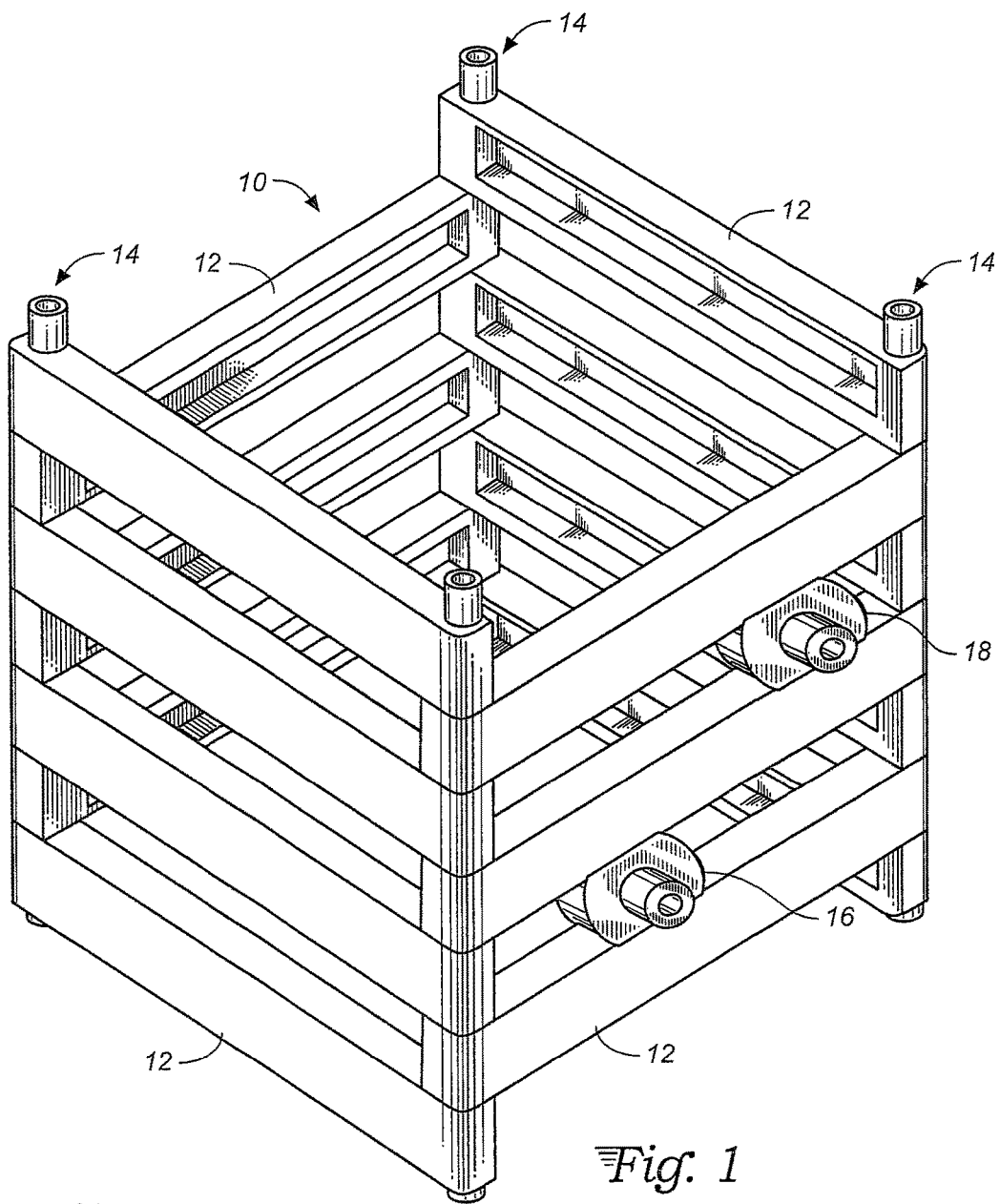
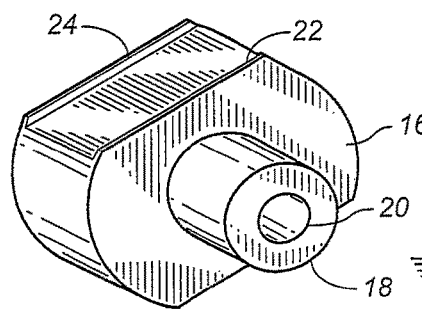
Fig. 1
Fig. 2

COLLAPSIBLE BOX WITH SIDE WALL ARTICLE SUPPORTS

CROSS REFERENCE TO RELATED APPLICATION

This application claims priority from provisional application Ser. No. 62/106,930 filed Jan. 23, 2015.

TECHNICAL FIELD

The invention relates to receptacles and, more particularly, to receptacles with side wall article supports.

BACKGROUND ART

In U.S. Pat. No. 4,664,282 to Michael and David Chan disclosed a collapsible plant holding structure made of rectilinear bar members that were hinged at each end using a pole that runs through ends of the bar members. The bar members are stacked so that there are spaces between parallel members in each direction with one bar being offset from a counterpart extending at right angles. The bars are stacked in four directions to define a rectangle or parallelogram. The disclosure of U.S. Pat. No. 4,664,282 is incorporated by reference herein and the article of manufacture disclosed therein is referred to as a Chan Box.

SUMMARY OF INVENTION

While the Chan Box of the prior art is useful for supporting plant pots and the like within the box, an object of the invention was to add decorative members to side walls external to the box without impairing the integrity of the box.

The above object has been met by modifying the Chan Box in a manner such that parallel rectangular bar members that form side wall panels trap grommets that span the thickness of the bar members. The grommets have a boss therein that projects outwardly beyond a plane of the panel. The boss has an aperture therein that serves as a pin retainer, the aperture generally in a parallel plane to the parallel bar members. A pin inserted into the pin retainer may have an upright decorative article which, if planar, is parallel to a side wall panel. In this manner, the integrity of side wall members is not affected.

BRIEF DESCRIPTION OF THE DRAWINGS

FIG. 1 is a perspective view of an assembled decorative box of the present invention.

FIG. 2 is a perspective view of a grommet for supporting a laterally extending structure.

DESCRIPTION OF INVENTION

Figure 3:
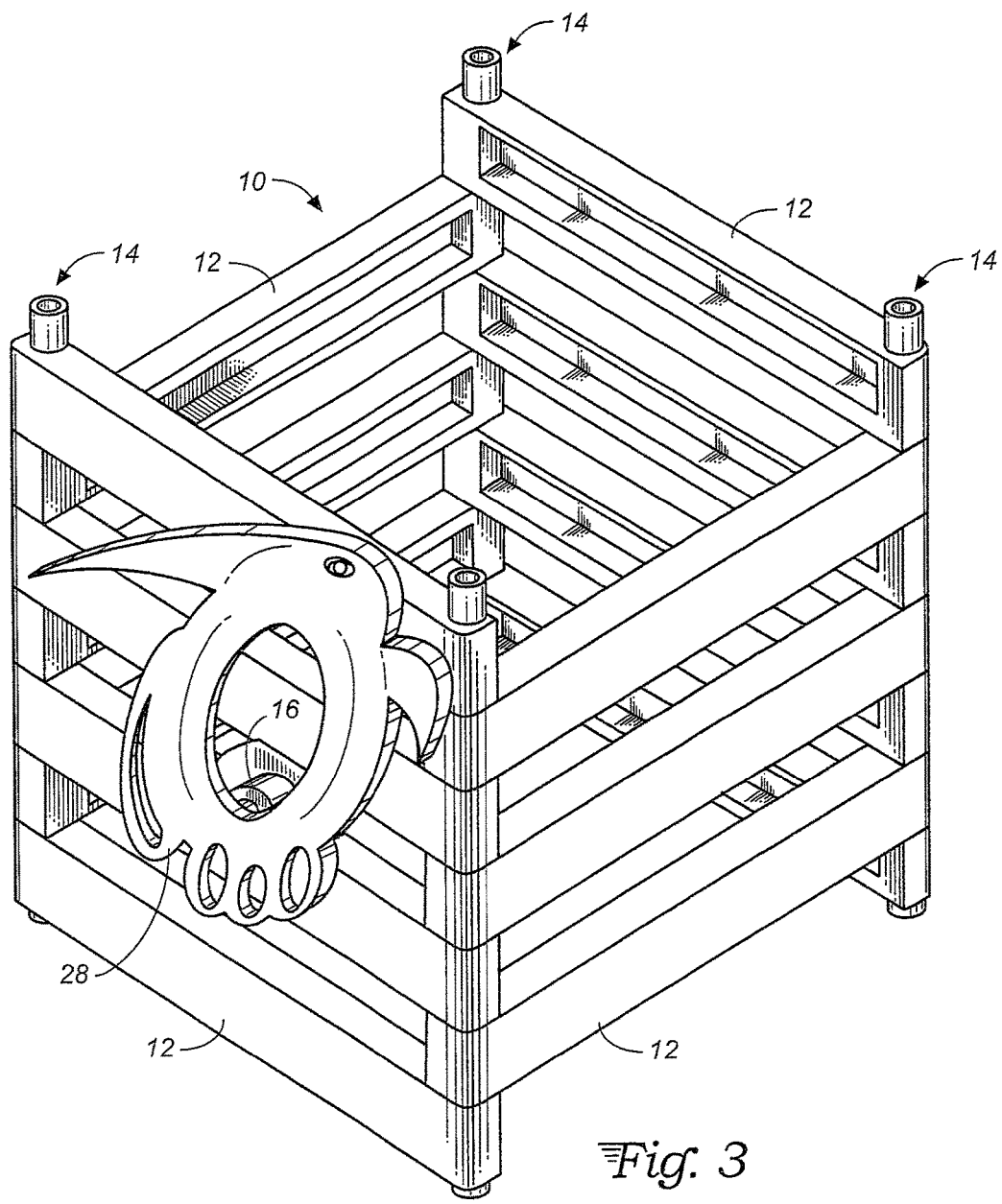
FIG. 3 is a perspective view of the apparatus of the apparatus of FIG. 2 with a laterally extending decorative structure.

With reference to FIG. 1, a plurality of parallel, generally rectangular bar members 12 are supported at each end by vertical posts 14 which extend through holes in opposite ends of each bar member to form a panel. Opposed panels are parallel but adjacent panels need not be at right angles, i.e. may be an inclined parallelogram in shape. "Generally rectangular" means that top and bottom sides of each bar member are parallel to each other, but other sides need not be parallel. The parallelogram forms a box. The arrangement of each panel resembles parallel upright fence posts supporting parallel, horizontal, spaced apart fence slats. Before posts are clamped in place to form a panel, the parallelogram structure is collapsible for compact shipping. Once the posts are clamped in place, the parallelogram structure is a rigid box.

Each horizontal bar member has a horizontal thickness which is a substantial fraction of the vertical height of a bar. For example, if a bar is 1 centimeter in height, the bar is at least one-half centimeter in thickness depth. The depth of the bars is used to trap grommets 16 and 18, each of which has a depth that slightly exceeds the depth of a horizontal bar. The grommets are trapped between adjacent bars.

Atop of each grommet are spaced apart ridges which engage edges of a bar. The spaced apart edges are like small rails that prevent the grommet from moving in or out of the box 10 once the grommet is seated in place. The grommets are seated in place by loosening a post 14 so that the bar members can be slightly moved up to allow insertion of the grommet and when moved down the post can be fastened in place, for example by screw threads at the end of the post that threads into a nut.

In FIG. 2 the grommet 16 is seen to have an outwardly extending boss 18 with a small central hole 20 which will be used to retain a pin of a decorative object. The grommet has a thickness at least equal to the bar thickness and supporting the pin and any decorative article associated with the pin. Atop of the grommet 16 are edges or rails 22 and 24 at opposed parallel sides which engage outside and inside edges of a horizontal bar member. Similar edges or rails are on the bottom side of the grommet 16 but cannot be seen. Each boss extends outwardly beyond a panel side wall.

FIG. 3 shows the variable shape box 10 with a decorative object 28 that has a rearwardly extending pin which has been pushed in to the hidden grommet 16 and specifically into the central hole in the grommet. In this manner, objects, particularly decorative objects may be supported from the sides of the box 10. The grommet serves as a lateral outwardly box extender member.

Figure 4:
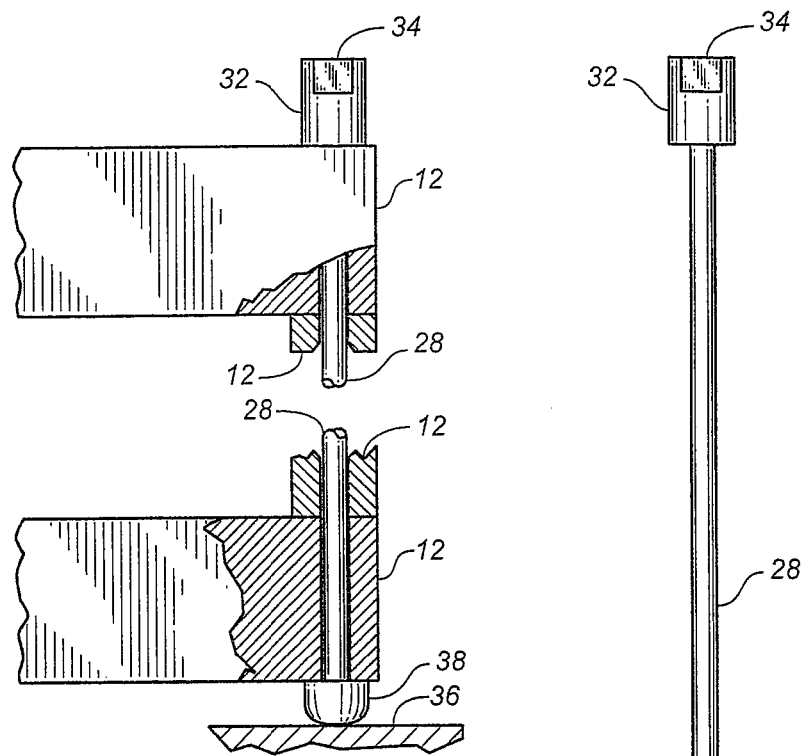
FIG. 4 is a side view illustrating joinder of horizontal bar members.

With reference to FIG. 4, horizontal bar members 12 are seen to be hinged in place through a post 28 that has a knob 32 at one end and a nut 38 at the opposite end with the nut resting surface 36. The knob 32 is seen to have a cup shaped indentation 34 into which a nut from another post can rest such that the post forms vertical upwardly extenders for stacking of boxes as shown in FIG. 6.

Figure 5:
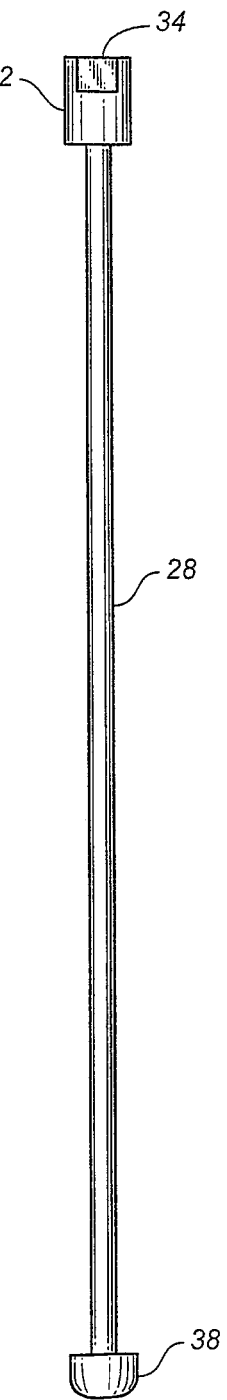
FIG. 5 is a side view of a post used for hinging bars of the type illustrated in FIG. 4.

FIG. 5 shows an upright post 28 with knob 32, indentation 34 and nut 38 which fits on threads at the bottom of the post. The nut is unscrewed and passed through holes in horizontal bar members to secure the bar members in place.

Figure 6:
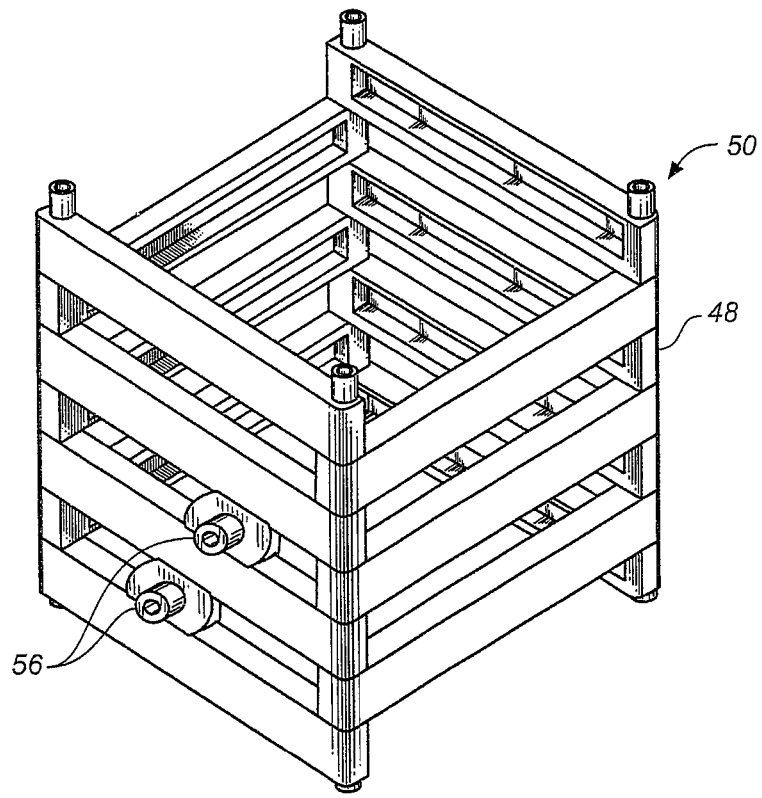
FIG. 6 shows a pair of decorative boxes of the type shown in FIG. 1 vertically supported using posts of the type shown in FIG. 5.
Figure 6:
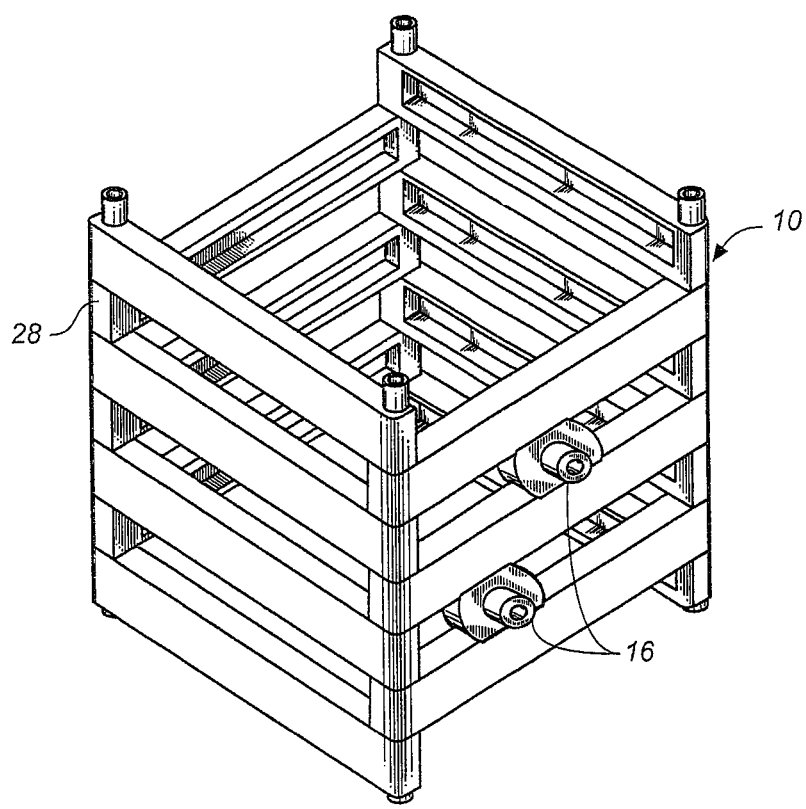

FIG. 6 illustrates vertical extension of a first box 10 supporting a second box 50 using the indentation at the top of post 28 to support the nut at the bottom of post 48 of the box 50. Of course, at least one other support post would be used to support box 50 with the box 10 providing only partial support. The idea is that the posts can form vertical extenders for the box and the grommets 16 and 56 can form outward extenders for the boxes that can support decorative articles.

Upward stacking of boxes allows for decorative arrangements of flower pots and the like while the outwardly extending grommets provide opportunities for mounting jewelry, sculptures or other decorative structures.

What is claimed is:

1. A collapsible box with side wall article supports comprising:
    an arrangement of four panels arranged in a parallelogram configuration, each panel having a plurality of parallel, generally rectangular bar members having opposite ends with holes therein, supported at each end by upright posts extending through holes of stacked bar members, the rectangular bar members having a characteristic bar thickness, and
    a plurality of grommets fitting tightly between adjacent parallel bar members, each grommet having a boss with a pin retainer therein, the grommet having a grommet thickness corresponding at least to the bar thickness that provides linear support for a pin retained in the boss, wherein each grommet has two parallel opposed sides, with each side having edgewise parallel rails that engage the bar members at opposed ends of the characteristic bar thickness.

2. A collapsible box with side wall article supports comprising:
    an arrangement of four panels arranged in a parallelogram configuration, each panel having a plurality of parallel, generally rectangular bar members having opposite ends with holes therein, supported at each end by upright posts extending through holes of stacked bar members, the rectangular bar members having a characteristic bar thickness, and
    a plurality of grommets fitting tightly between adjacent parallel bar members, each grommet having a boss with a pin retainer therein, the grommet having a grommet thickness corresponding at least to the bar thickness that provides linear support for a pin retained in the boss, wherein each boss extends outwardly beyond parallel side rails of a panel.

* * * * *